G. T. SODERSTROM.
CREAM SEPARATOR.
APPLICATION FILED JULY 23, 1909.

950,605.  Patented Mar. 1, 1910.

WITNESSES

INVENTOR
G. T. SODERSTROM

BY

ATT'Y.

UNITED STATES PATENT OFFICE.

GUSTAF THEODOR SODERSTROM, OF RENFREW, ONTARIO, CANADA, ASSIGNOR TO THOMAS ANDREW LOW, OF RENFREW, CANADA.

CREAM-SEPARATOR.

950,605.  Specification of Letters Patent.  Patented Mar. 1, 1910.

Application filed July 23, 1909. Serial No. 509,248.

*To all whom it may concern:*

Be it known that I, GUSTAF THEODOR SODERSTROM, of Renfrew, in the Province of Ontario, Canada, have invented certain new and useful Improvements in Cream - Separators, of which the following is a specification.

My invention relates to improvements in cream separators, of the type employing a plurality of conical liner plates in the bowl, and the objects of my invention are to provide an improved distributing member which will permit the free inward passage of the cream without interfering with the outgoing milk, and which will, at the same time, effect a partial separation of the full milk in passing to the liner plates, and it consists essentially of a distributing member formed with a plurality of spirally inclined plates which extend to the inner edge of the liner plates, the said distributing member being supplied, at the center, with milk, all as hereinafter more fully set forth and described in detail in the accompanying specifications and drawings.

Figure 2:
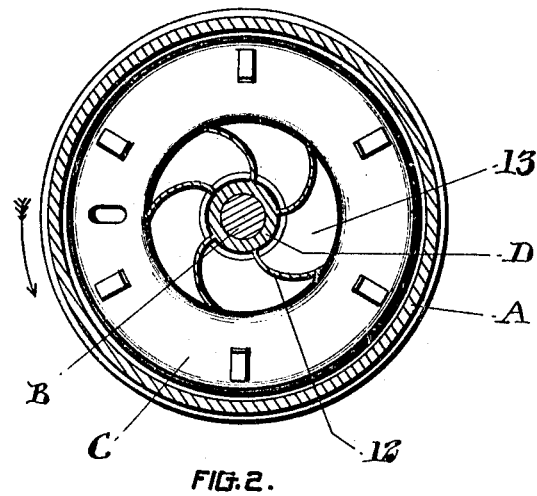
Figure 1:
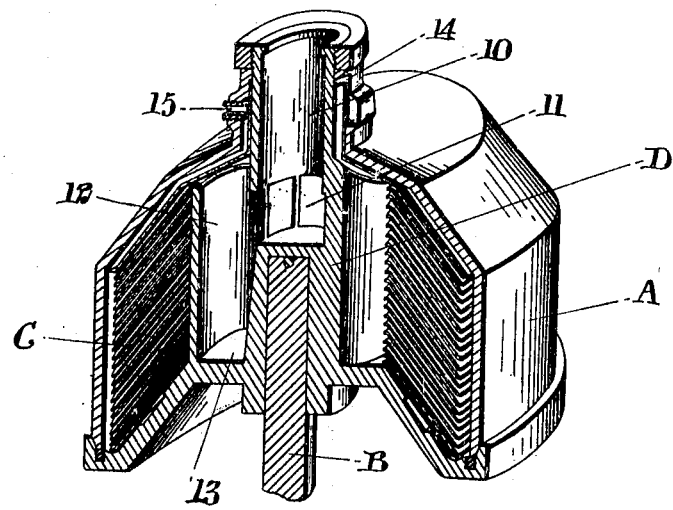

In the drawings, Figure 1 is a sectional perspective view of the bowl. Fig. 2 is a horizontal section through the same.

In the drawings, like figures of reference indicate corresponding parts in each figure.

Referring to the drawings, A represents the bowl of any suitable shape, and B the supporting shaft therefor, connected thereto in the usual manner and rotated by suitable means not illustrated.

C represents the liner plates on the interior of the bowl of usual conoidal form, and spaced a short distance apart.

D represents the central distributing member which, in the embodiment illustrated, is formed integral with the base of the bowl. This distributing member is formed with a tubular central portion 10 into which the full milk is introduced by suitable means, the said central portion being provided with apertures 11 at substantially the center of the liner plates, through which the milk may pass into the bowl.

In accordance with the present invention, the distributing member is formed on the exterior with a plurality of spirally curved distributing wings 12, which extend outwardly a short distance to the inner edge of the liner plates G, the said inner edge being readily moved from the tubular central portion of the distributing member, whereby an annular space 13 will be provided between.

In operation, the bowl is driven in the direction of the arrows in Fig. 2, and the full milk is fed into the central distributing member. It passes through the apertures 11 and out along the inner or concave side of the wings 12 into the liner plates. At the same time, the separated cream will be moving inwardly and upwardly along the outer or convex side of the wings 12, and it will finally pass out a suitable outlet 14. The separated milk will pass to the exterior of the liner plates and up along the annular space provided between the outer edge of the liner plates and the inner periphery of the bowl, finally passing out the outlet 15.

It will be observed that the space between the distributing wings is much greater than the width of the wings themselves, and consequently, access may be readily had to the interior of the distributing member and the milk will have a full clear space in passing outwardly, much better than it would have if the wings were perforated in form.

In describing the central distributing wings, in the following claim, the terms "upper" and "lower" portions are used. The term "upper portion" is intended to refer to the upper tubular portion extending through the bowl of the separator, while the term "lower portion" is intended to refer to that portion which extends upwardly from the bottom of the bowl and surrounds the spindle B.

What I claim as my invention is:—

A cream separator having a bowl, a plurality of parallel conoidal liner plates spaced a short distance apart, and a central division member having a tubular portion extending through the top of the bowl, said tubular portion being cut away circumferentially a portion of its length, a plurality of solid spirally shaped distributing wings having their inner edges integrally connected to said tubular portion and spaced between said cut away portions and the outer edges thereof extending to the inner edges of the liner plates, the space between said wings being of much greater width than the wings themselves, whereby access may be readily had to the interior of the distributing member.

In witness whereof I have hereunto set my hand in the presence of two witnesses.

GUSTAF THEODOR SODERSTROM.

Witnesses:
MARY C. LYON,
M. GILBERTSON.